(12) United States Patent
Okita et al.

(10) Patent No.: US 6,693,693 B1
(45) Date of Patent: Feb. 17, 2004

(54) LIQUID CRYSTAL DISPLAY

(75) Inventors: Mitsutaka Okita, Ishikawa-gun (JP); Keisuke Tsuda, Ishikawa-gun (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/601,136

(22) PCT Filed: Mar. 23, 1999

(86) PCT No.: PCT/JP99/01430
§ 371 (c)(1),
(2), (4) Date: Sep. 12, 2000

(87) PCT Pub. No.: WO99/14357
PCT Pub. Date: Sep. 30, 1999

(30) Foreign Application Priority Data

Mar. 23, 1998 (JP) .......................................... 10-072933

(51) Int. Cl.[7] .................................................. G02F 1/13
(52) U.S. Cl. ...................................... 349/119; 349/117
(58) Field of Search .................................. 349/117, 119

(56) References Cited

U.S. PATENT DOCUMENTS 6,034,756 A * 3/2000 Yuan et al. ................. 349/119
6,064,457 A * 5/2000 Aminaka .................... 349/117
6,137,554 A * 10/2000 Nakamura .................... 349/75
6,320,634 B1 * 11/2001 Winker et al.
6,411,355 B1 * 6/2002 Manabe et al. ............. 349/120

FOREIGN PATENT DOCUMENTS

| JP | 2-35416 | 2/1990 |
|---|---|---|
| JP | 7-49509 | 2/1995 |
| JP | 7-84254 | 3/1995 |
| JP | 8-327822 | 12/1996 |
| JP | 9-120059 | 5/1997 |
| JP | 9-146086 | 6/1997 |
| JP | 9-160022 | 6/1997 |
| JP | 9-178937 | 7/1997 |
| JP | 10-48420 | 2/1998 |

* cited by examiner

Primary Examiner—James Dudek
(74) Attorney, Agent, or Firm—Parkhurst & Wendel, L.L.P.

(57) ABSTRACT

An OCB mode liquid crystal display in which liquid crystal molecules are bend-aligned, wherein a uniaxial phase plate having a positive optical anisotropy is so disposed that the major axis is not perpendicular to the direction of orthogonal projection of the liquid crystal molecules onto the substrate and preferably generally parallel to the direction of the polarization axis of a polarizer, thereby achieving a high contrast in a very wide viewing angle.

9 Claims, 11 Drawing Sheets

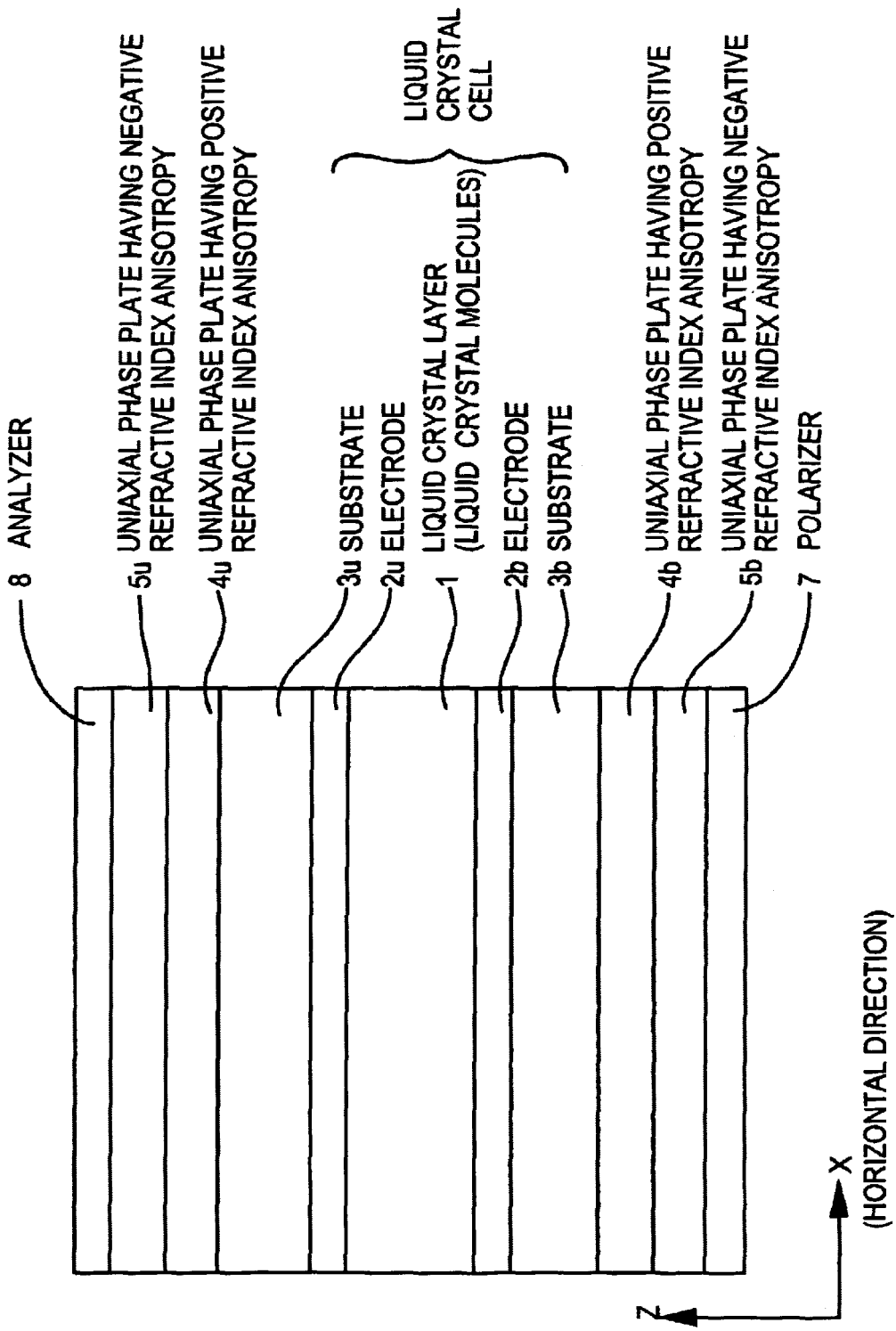

LIQUID CRYSTAL DISPLAY

FIELD OF THE INVENTION

The present invention relates to a liquid crystal display device used as a flat display for OA equipment and the like.

BACKGROUND OF THE INVENTION

In recent years, a liquid crystal display device (hereinafter LCD) has been widely used as a flat display in personal computers, word processors, car navigation systems and the like because of such features as thin construction, light weight and small power consumption. Furthermore, hopes run high nowadays that an LCD will replace a CRT display, resulting in a vigorous effort to develop and commercialize a large screen LCD. As the screen size of an LCD increases, a much more requirement has been made of the LCD to increase viewing angles.

A few methods have so far been proposed to realize an increase in viewing angle of an LCD. Among the methods proposed, a method utilizing an OCB (Optically Compensated Birefringence) mode, in which liquid crystal molecules are bend-aligned, receives much attention even as a display device for moving pictures since the switching speed thereof shows the order of several milliseconds, which is faster than the speed of a normal TN mode by an order of magnitude.

The liquid crystal molecules used in the OCB mode shows optically positive uniaxial anisotropy in refractive index, together with configuration anisotropy and dielectric anisotropy. The optical axis of the liquid crystal molecules coincides with the direction of the molecules' major axis. The bend alignment means that within a liquid crystal layer 1 sandwiched between two substrates 3$u$ and 3$b$, as FIG. 11 shows a cross-sectional view thereof on an X-Z plane, liquid crystal molecules 20 are aligned within the X-Z plane from the top to downward while changing respective alignment directions in such a way as they are aligned nearly symmetrically with respect to a plane 21 that divides the liquid crystal layer 1 into equal two halves. In the OCB mode, the effective retardation of a liquid crystal layer can be varied by changing the direction of liquid crystal molecules through a voltage applied to liquid crystal cells. When a change in retardation takes place, the polarization state of the light passing through the liquid crystal layer changes. This change in the polarization state is picked up as a change in transmissivity by the action of an analyzer and a polarizer, and is used for image displaying.

In the Published Unexamined Japanese Patent Application No. H7-49509, disclosure is made on a technology for expanding a viewing angle range in addition to lowering a driving voltage by attaching a phase plate for producing a negative phase difference to the liquid crystal cells, which are bend-aligned as described above. Accordingly, the viewing angle range, where no inversion of black and white takes place, is expanded in comparison with the case where no phase plate is used. As a setup for producing a negative phase difference, such an arrangement as the optical axis of a positive birefringence medium being made perpendicular to the optical axes of liquid crystal molecules or as the optical axis of a negative birefringence medium being made parallel to the optical axes of liquid crystal molecules or the like is proposed. Also, as the material for producing a negative phase difference, a proposal is made, as the Published Unexamined Japanese Patent Application No. H8-327822 discloses, about a phase difference film having discotic liquid crystal molecules with negative refractive index anisotropy hybrid-aligned.

However, with the conventional LCD as described above, as the angle of a viewer's line of sight making with the normal to the display surface increases, the brightness in the black display state observed on the display screen increases, thus indicating a problem that the contrast is still highly dependent on a viewing angle. Particularly, in the direction perpendicular to the optical axes of liquid crystal molecules sandwiched between substrates, the viewing angle dependency in the state of black displaying is large enough to cause a problem of substantial degrading of the contrast in a black displaying state.

The present invention deals with the foregoing problem and proposes an LCD with excellent viewing angle characteristics by preventing the contrast degradation in the direction perpendicular to the optical axes of liquid crystal molecules even in the black displaying state where the viewing angle dependency is especially large.

DISCLOSURE OF THE INVENTION

A liquid crystal display of the present invention has a structure comprising:

two substrates;

a liquid crystal layer sandwiched between the two substrates, in which liquid crystal molecules are bend-aligned;

a polarizer and an analyzer with respective polarization axes intersecting each other at right angles;

a uniaxial phase plate having negative optical anisotropy;

a uniaxial phase plate having positive optical anisotropy and having the optical axis thereof made perpendicular to the direction of orthogonal projection of the optical axes of liquid crystal molecules onto the substrate; and an additional uniaxial phase plate having positive optical anisotropy and having the optical axis thereof made not perpendicular to the direction of orthogonal projection of the optical axes of liquid crystal molecules onto the substrate, and more preferably the direction of the optical axis of the additional uniaxial phase plate is made nearly parallel to the direction of the polarization axis of the analyzer. Accordingly, the liquid crystal display device is allowed to prevent the contrast from degrading in the direction perpendicular to liquid crystal molecules even in the black displaying state where a viewing angle dependency is large, thereby achieving excellent viewing angle characteristics.

Also, a liquid crystal display device of the present invention has a structure comprising:

two substrates;

a liquid crystal layer sandwiched between the two substrates, in which liquid crystal molecules are bend-aligned;

a polarizer and an analyzer with respective polarization axes intersecting each other at right angles;

a biaxial phase plate having positive and negative optical anisotropy; and a uniaxial phase plate having positive optical anisotropy and having the optical axis thereof made not perpendicular to the direction of orthogonal projection of the optical axes of liquid crystal molecules onto the substrate.

Also, a liquid crystal display device of the present invention has a structure comprising:

two substrates;

a liquid crystal layer sandwiched between the two substrates, in which liquid crystal molecules are bend-aligned;

a polarizer and an analyzer with respective polarization axes intersecting each other at right angles;

a phase plate formed of an optical medium having negative refractive index anisotropy with the major axis thereof being hybrid-aligned;

a uniaxial phase plate having positive optical anisotropy; and an additional uniaxial phase plate having positive optical anisotropy and having the optical axis thereof made not perpendicular to the direction of orthogonal projection of the optical axes of liquid crystal molecules onto the substrate.

As described in the above, by having an additional uniaxial phase plate with positive optical anisotropy disposed so as to make the major axis thereof not perpendicular to the direction of orthogonal projection of the optical axes of liquid crystal molecules onto the substrate and, in particular, to make nearly parallel to the direction of the polarization axis of the analyzer, the liquid crystal display device is allowed to achieve a high contrast over a very wide range of viewing angle.

BRIEF DESCRIPTION OF THE DRAWINGS

FIG. 4 is a diagrammatic sketch to show construction of a liquid crystal display device prepared according to the conventional technology.

DETAILED DESCRIPTION OF PREFERRED EMBODIMENTS

Next, detailed descriptions are made on exemplary embodiments of the present invention with reference to drawings.

First Exemplary Embodiment

In order to provide an easy understanding of the present invention, a description is first given to a conventional technology with reference to FIG. 2 to FIG. 5, and then a first exemplary embodiment of the present invention is described with reference to FIG. 1, FIG. 2 and FIG. 6 by making a comparison with the conventional technology. FIG. 2 is commonly used in describing the conventional technology and the present invention.

Figure 1:
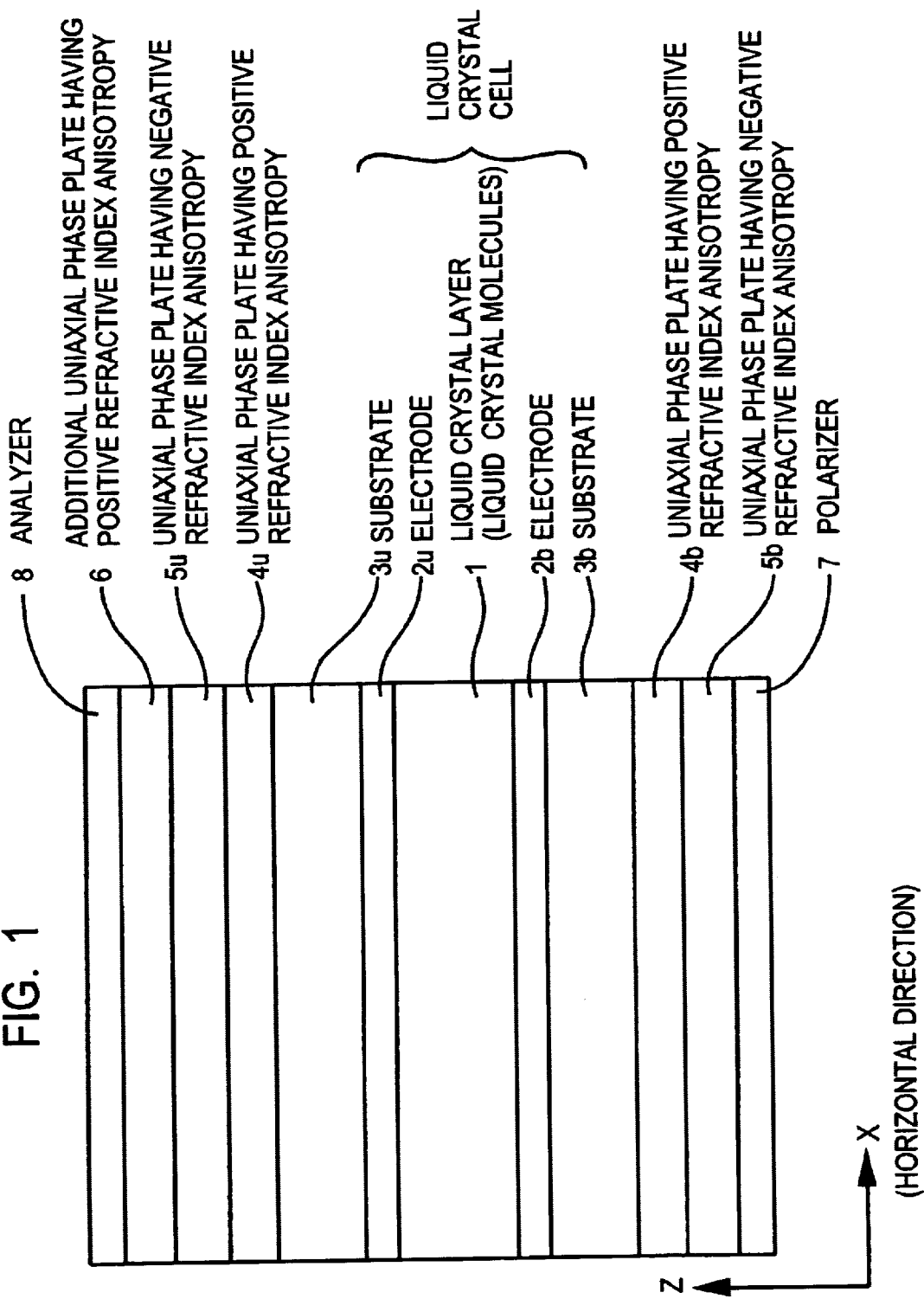
FIG. 1 is a diagrammatic sketch to show construction of a liquid crystal display device in a first exemplary embodiment of the present invention.
Figure 2:
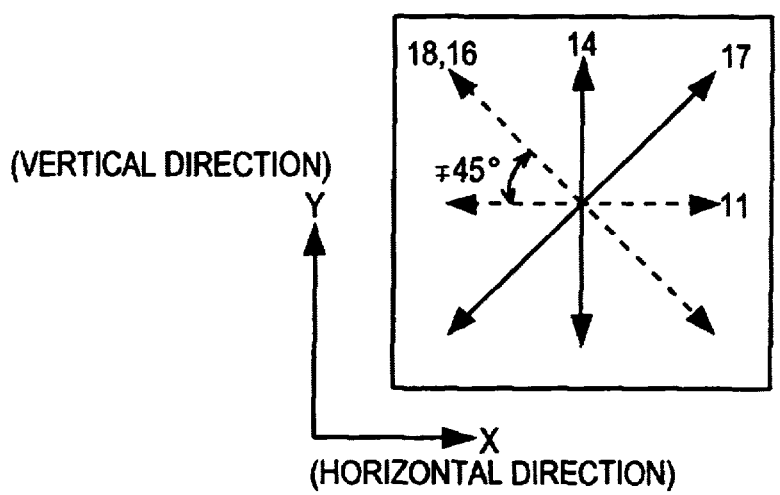
FIG. 2 is a plan view prepared for describing alignment directions of phase plates' optical axes.
Figure 12:
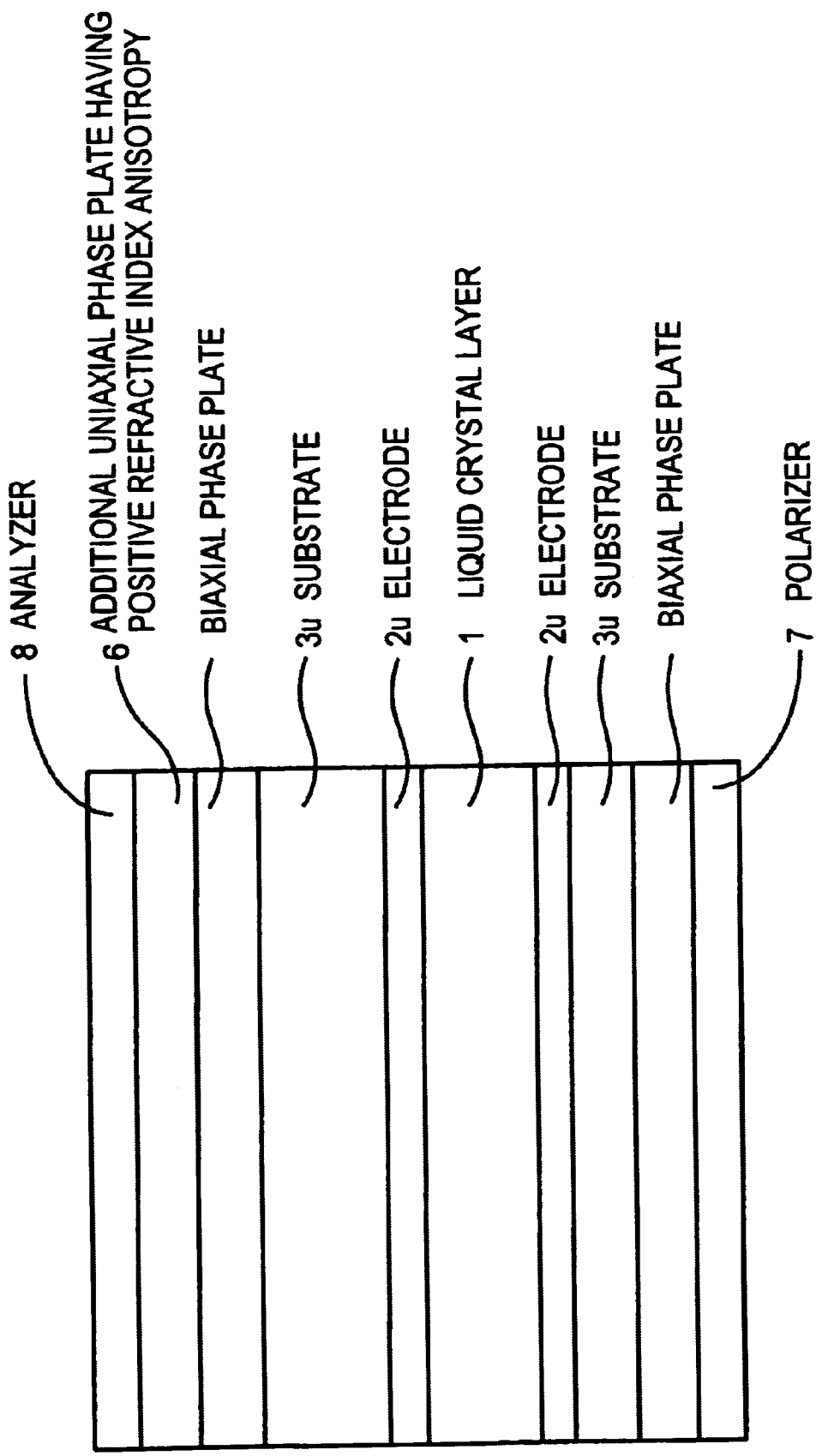
FIG. 12 is a diagrammatic view showing relative location of the component layers of the present invention shown in FIG. 1.

FIG. 12 is a diagrammatic view showing relative location of the component layers of the present invention shown in FIG. 1. FIG. 12 shows the liquid crystal display device as comprising a polarizer 7 and an analyzer 8 with respective polarization axes intersecting each other at right angles, two substrates 3u disposed between the polarizer 7 and the analyzer 8, a liquid crystal layer sandwiched between the substrates 3u, a uniaxial phase plate 6 having negative optical anisotropy and having the optical axis direction thereof oriented perpendicular to the substrate disposed between the polarizer 7 or the analyzer 8 and the nearer of the two substrates 3u, and an additional uniaxial phase plate 6 having positive optical anisotropy with the optical axis direction thereof oriented not perpendicular to the direction of orthogonal projection of the optical axes of the liquid crystal molecules disposed between the polarizer 7 or the analyzer 8 and the nearer of the two substrates 3u.

FIG. 4 is a partial cross-sectional view of an LCD prepared according to a conventional technology when the liquid crystal display device is cut by an X-Z plane. As FIG. 4 shows, a liquid crystal layer 1 is sandwiched between substrates 3u and 3b formed of glass, quartz or the like. On the substrates 3u and 3b are disposed electrodes 2u and 2b for driving liquid crystal molecules inside of the liquid crystal layer 1. Although not shown in FIG. 4, a switching element such as a thin film transistor, thin film diode or the like is formed on any one substrate out of the substrates 3u and 3b, thereby performing a switching action for a voltage to be applied to the electrode 2u or electrode 2b.

Figure 11:
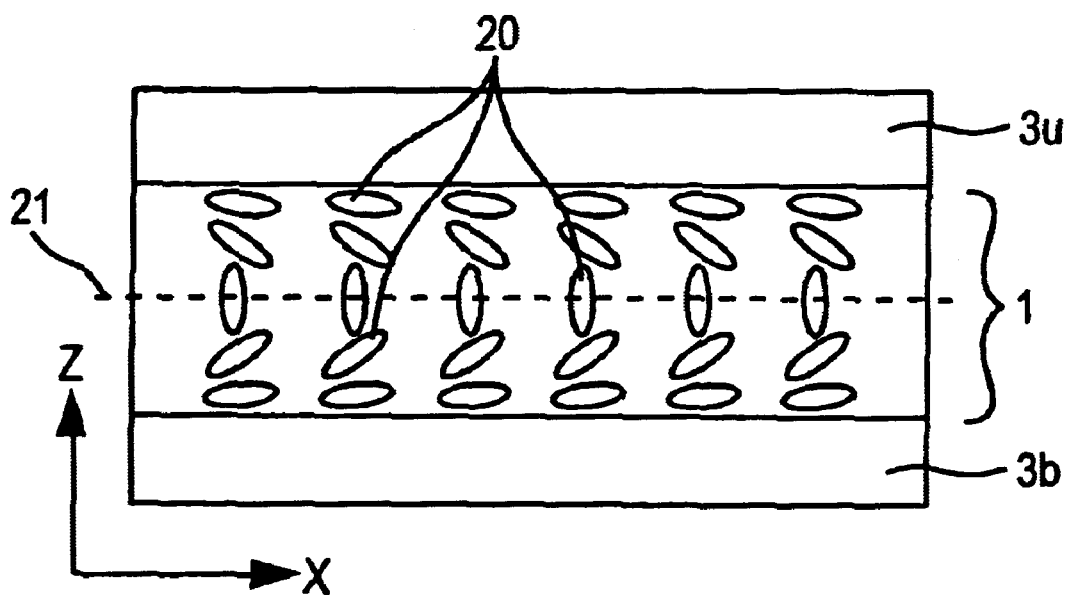
FIG. 11 is a diagram to describe bend-aligned liquid crystals.

The liquid crystal molecules inside of the liquid crystal layer 1 are bend-aligned within the X-Z plane as FIG. 11 shows and operate in an OCB mode. Orthogonal projections of the optical axes of the liquid crystal molecules onto the electrodes 2u and 2b and the substrates 3u and 3b are situated in the direction of an arrow 11 or in parallel with the X axis as the X-Y plane of FIG. 2 shows. In FIG. 2, the reference numeral 17 indicates the polarization axis direction of a polarizer 7 and the reference numeral 18 indicates the polarization axis direction of an analyzer 8.

Figure 3:
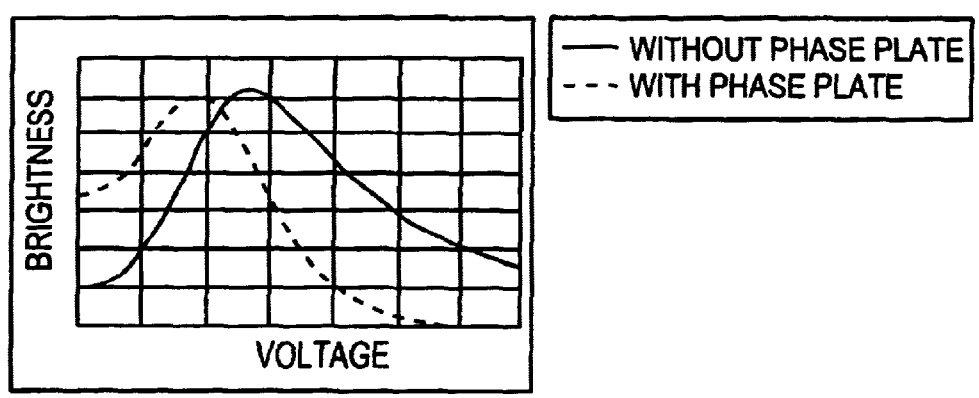
FIG. 3 is a diagram to show voltage-transmissivity characteristics of a liquid crystal display device prepared according to a conventional technology.

First, a description is made on performance characteristics of an LCD formed of the composing elements as FIG. 4 shows excluding phase plates 4u, 4b, 5u and 5b. The curve of a solid line in FIG. 3 is a curve of voltage-transmissivity characteristics of the LCD when the polarization axes of 17 and 18 of the polarizer 7 and analyzer 8, respectively, are made perpendicular to each other, i.e., the liquid crystal display device is operated under an NW (Normally White)

mode. Under the OCB mode operation, a bias voltage is needed for the liquid crystal molecules to be bend aligned. In FIG. 3, a voltage, at which brightness reaches a peak value, corresponds to the bias voltage and a region, where the brightness continues to decrease with an increase in voltage, is used as an operating region. As FIG. 3 shows, the conventional OCB mode requires an excessively broad region, thereby requiring a high voltage to be applied for performing black displaying.

In addition, under the OCB mode operation, the optical retardation due to the liquid crystal layer's birefringence is adjusted by an applied voltage, thereby controlling the polarization state of the incident light and performing displaying, with transmissivity, i.e. brightness being modulated. On the other hand, the viewing angle dependency is caused by a change in the polarization state due to a variation in the retardation that takes place according to the direction of the incident light. The viewing angle dependency of the liquid crystal layer's retardation when the incident light is slanted towards the X axis direction can be self-compensated to a fairly large extent by a symmetrical alignment of the liquid crystal molecules, i.e., the bend alignment, but when the incident light is slanted towards the Y axis direction, much compensation does not take place, resulting in fairly large viewing angle dependency still remaining.

Therefore, in order to lower the driving voltage by increasing retardation as a whole and also to compensate for the viewing angle dependency in the Y axis direction, the uniaxial phase plates 4u and 4b having positive refractive index anisotropy are usually disposed in such a way as making the optical axes thereof (a double-headed arrow 14 in FIG. 2) perpendicular, respectively, to the direction of orthogonal projection of the optical axes of liquid crystal molecules onto the substrate (a double-headed arrow 11 in FIG. 2), i.e., parallel to the Y axis direction, as FIG. 4 shows. Further, since the optical path length increases in the liquid crystal layer 1 and phase plates 4u and 4b as the incident light slants with a resulting change in retardation, the uniaxial phase plates 5u and 5b having negative refractive index anisotropy are disposed so as to have the optical axes thereof made nearly parallel to the Z axis, respectively, to compensate for the change in retardation. Additionally, in order to utilize effectively the change in retardation of the liquid crystal layer 1 due to voltage, an arrangement is made in such a way that the angle between the polarization axis direction 17 of the polarizer 7 and the direction of orthogonal projection of the optical axes of liquid crystal molecules onto the substrate (a double-headed arrow 11 in FIG. 2) makes about 45°, thereby having the voltage-transmissivity characteristics improved as indicated by a broken line in FIG. 3.

Figure 5A:
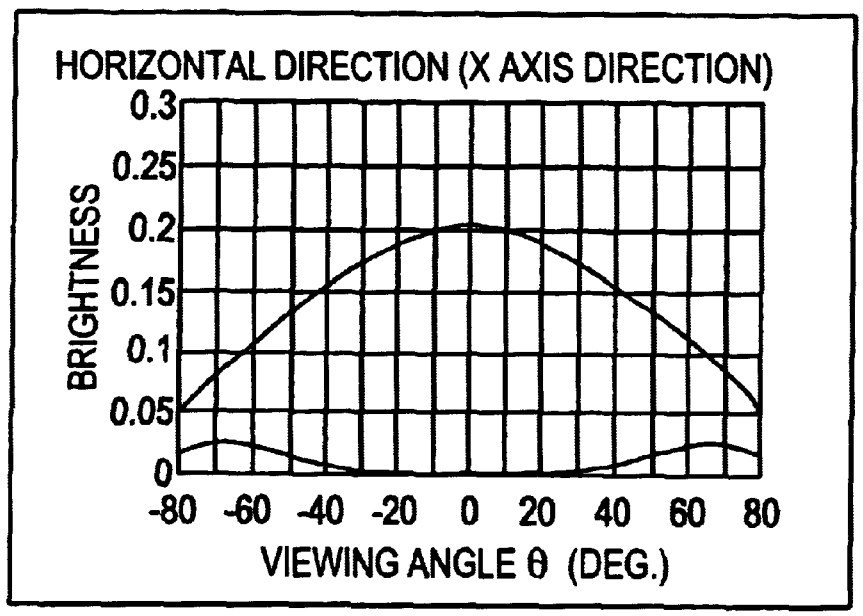
FIG. 5 shows diagrams to describe how white display brightness and black display brightness are dependent on viewing angles with a liquid crystal display device prepared according to the conventional technology.
Figure 5B:
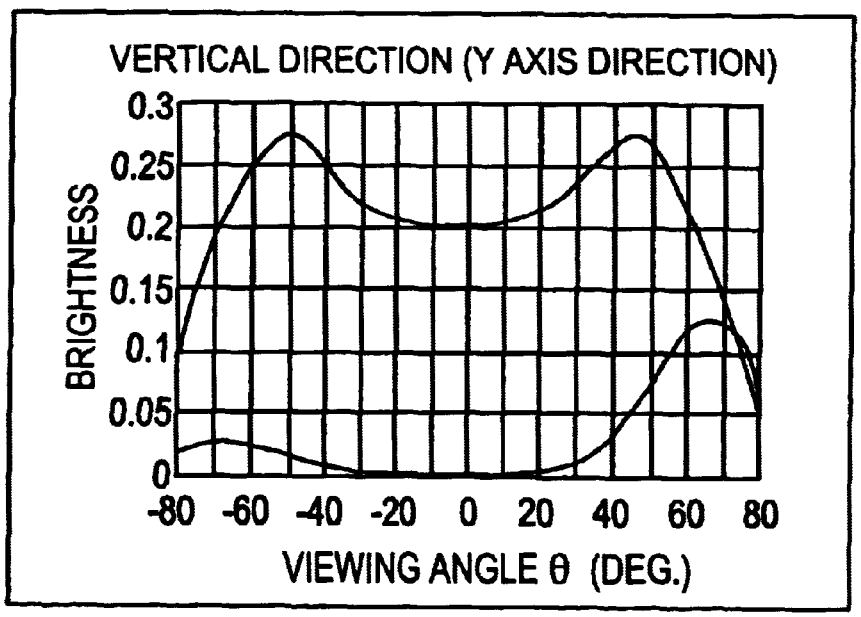

With the structure of the conventional LCD as described above, suppose the case where a product ($\Delta n \times d$) of liquid crystal molecule's refractive index anisotropy An and a thickness d of the liquid crystal layer 1 is 830 nm, the total of the uniaxial phase plates 4u and 4b having positive refractive index anisotropy in retardation is 50 nm and the total of the uniaxial phase plates 5u and 5b having negative refractive index anisotropy in retardation is 600 nm. FIG. 5 shows viewing angle dependency of brightness in white displaying and black displaying in the foregoing case.

In FIG. 5, the horizontal direction means the X axis direction in FIG. 4 and FIG. 2, and the vertical direction means the Y axis direction in FIG. 2. The viewing angle $\theta$ is a slanting angle making with the direction of the normal to the substrate, i.e., the Z axis direction of FIG. 4 and, when the slanting is made from the Z axis in the positive direction of the X axis and from the Z axis in the positive direction of the Y axis, the $\theta$ is defined as being positive. Ordinates in FIG. 5 are normalized with the brightness of the light source taken as 1 on the scale. Accordingly, with the structure of the conventional LCD, as the slanting angle from the Z axis increases, the brightness in black display state increases. Particularly, asymmetry in the vertical direction is large and the brightness increase in black display state is very prominent when the viewing angle $\theta$ is in the positive direction, resulting in low contrast.

In contrast to the conventional LCD as described in the above, FIG. 1 shows the construction of an LCD in a first exemplary embodiment of the present invention. What differs in FIG. 1 from FIG. 4 of the conventional LCD is in having an additional uniaxial phase plate 6 having positive refractive index anisotropy in place in addition to the conventional structure. Other composing elements are the same as described in FIG. 4 and the description of those other composing elements is omitted here. In the first exemplary embodiment, the additional uniaxial phase plate 6 having positive refractive index anisotropy is disposed in such a way as making the optical axis thereof (a double-headed arrow 16 in FIG. 2) not perpendicular to the direction of orthogonal projection of the optical axes of liquid crystal molecules onto the substrate (a double-headed arrow 11 in FIG. 2), and favorably making nearly parallel to the polarization axis (a double-headed arrow 18 in FIG. 2) of the analyzer 8, for example. By introducing such a new phase plate in a new optical alignment, an effect of more precise compensation for the viewing angle dependency of retardation is demonstrated in FIG. 6.

Figure 6A:
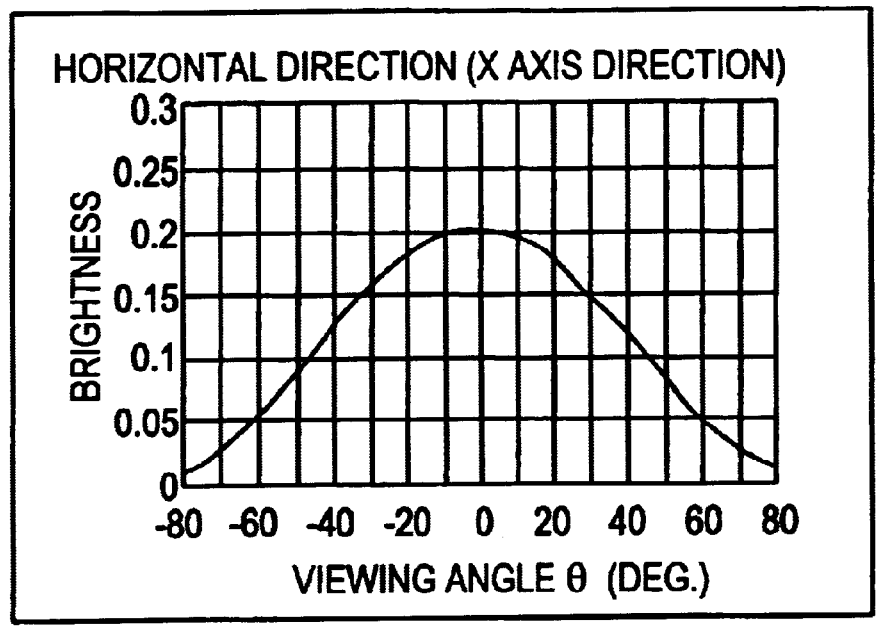
FIG. 6 shows diagrams to describe how white display brightness and black display brightness are dependent on viewing angles with the liquid crystal display device in the first exemplary embodiment of the present invention.
Figure 6B:
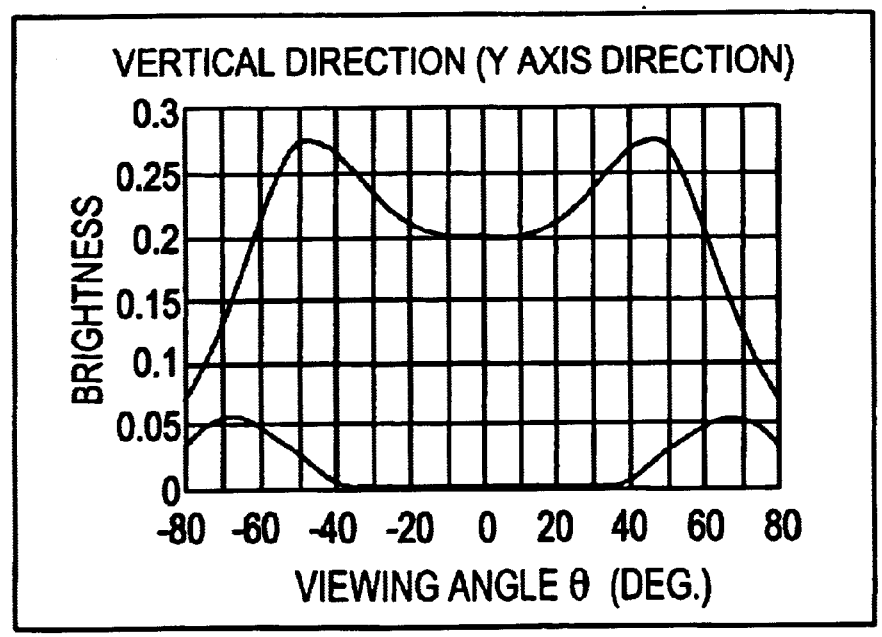

FIG. 6 shows the viewing angle dependency of brightness in white display state and black display state when an additional uniaxial phase plate 6 having positive refractive index anisotropy and retardation value of 150 nm is put in place.

When compared with FIG. 5 that corresponds to the conventional structure as FIG. 4 shows, it is obvious that the existence of the additional uniaxial phase plate 6 can contribute to a further reduction of the viewing angle dependency in the horizontal direction at the time of black display state, an improvement of asymmetry in the vertical direction and, in particular, the prevention of the brightness increase in black display state when the viewing angle $\theta$ is in the positive direction.

When a comparison is made in the viewing angle range with contrast ratio of 10 or more, the viewing angle with the structure of the conventional LCD ranges from −50° to 50° in the horizontal direction and −63° to 40° in the vertical direction, while the structure of the first exemplary embodiment showing an improvement to −80° to 80° in the horizontal direction and −50° to 50° in the vertical direction, resulting in gaining high contrast over a wide range of viewing angles.

Thus, with inclusion of the additional uniaxial phase plate 6, the dependency on viewing angles at the time of black displaying is reduced remarkably and asymmetry in the vertical direction is also improved, hereby enabling the realization of an LCD with wide viewing angles and excellent viewability.

Although the reason why such a large effect of expanding viewing angles by an introduction of the additional uniaxial phase plate 6 is gained has not yet been elucidated sufficiently, it is recognized that there exists an improvement effect exceeding the mere improvements brought about by compensating for the shift in effective angle between analyzer and polarizer from the right angle against the light incident in a slanting direction.

Although the present exemplary embodiment is based on such settings as a product (Δn×d) o f liquid crystal molecule's refractive index anisotropy Δn and a thickness d of the liquid crystal layer 1 is 830 nm, the total of the uniaxial phase plates 4u and 4b having positive refractive index anisotropy is 50 nm in retardation, the total of the uniaxial phase plates 5u and 5b having negative refractive index anisotropy is 600 nm in retardation and the additional uniaxial phase plate 6 having positive refractive anisotropy is 150 nm in retardation, the effectiveness of the present invention is not restricted by the foregoing specific settings. For example, when a liquid crystal different from above in characteristics is used, it suffices that the summation of retardation of respective uniaxial phase plates 4u and 4b having positive refractive index anisotropy is set up so as to be equal to the retardation of the liquid crystal layer 1 under the state of black displaying. Also, it suffices that the retardation of respective uniaxial phase plates 5u and 5b having negative refractive index anisotropy is set up so as to compensate for the variation in retardation of the liquid crystal layer when the light is incident in a slanting direction. Further, the retardation of the additional uniaxial phase plate 6 is allowed to be set up arbitrarily within the scope where an improvement in viewing angle characteristics is made possible. All in all, the effectiveness of the present invention is recognizable in any of the foregoing cases.

Although the optical axis (a double-headed arrow 16 in FIG. 2) of the additional uniaxial phase plate 6 having positive refractive index anisotropy is made nearly parallel to the polarization axis (a double-headed arrow 18 in FIG. 2) of the analyzer in the foregoing, the high contrast range can be expanded even when the optical axis of the additional uniaxial phase plate 6 is made nearly parallel to the polarization axis (a double-headed arrow 17 in FIG. 2) of the polarizer 7. However, the aligning the optical axis (the double-headed arrow 16 in FIG. 2) of the additional uniaxial phase plate 6 nearly in parallel with the polarization axis (the double-headed arrow 18 in FIG. 2) makes the effect of viewing angle expansion more enhanced, resulting in a favorable consequence.

Second Exemplary Embodiment

With the structure of a conventional LCD as FIG. 4 shows, the uniaxial phase plate 5u having negative refractive index anisotropy and the uniaxial phase plate 4u having positive refractive index anisotropy can be considered optically to be equivalent to a single optically biaxial phase plate. Therefore, it is possible for the structure of the conventional LCD to be considered as including a LCD formed by replacing with an optically biaxial phase plate a uniaxial phase plate 5u having negative refractive index anisotropy and a uniaxial phase plate 4u having positive refractive index anisotropy, and also a uniaxial phase plate 4b having positive refractive index anisotropy and a uniaxial phase plate 5b having negative refractive index anisotropy. Accordingly, with the structure of an LCD in FIG. 1 also, an LCD formed by replacing with an optically biaxial phase plate a uniaxial phase plate 4u having positive refractive index anisotropy and a uniaxial phase plate 5u having negative refractive index anisotropy, and also a uniaxial phase plate 4b having positive refractive index anisotropy and a uniaxial phase plate 5b having negative refractive index anisotropy, is included in the scope of the present invention, which constitutes an LCD of the present second exemplary embodiment.

Optically, the LCD in the present exemplary embodiment is the same as described in the first exemplary embodiment and, when a product (Δn×d) of liquid crystal molecule's refractive index anisotropy Δn and a thickness d of the liquid crystal layer 1 is set to 830 nm, the viewing angle dependency of brightness at the time of white displaying and black displaying becomes the same as FIG. 5 shows with the structure of the conventional LCD and becomes entirely the same as FIG. 6 shows with the LCD in the present second exemplary embodiment. More specifically, even with the LCD formed by replacing with an optically biaxial phase plat the uniaxial phase plate 4u having positive refractive index anisotropy and uniaxial phase plate 5u having negative refractive index anisotropy, and also the uniaxial phase plate 4b having positive refractive index anisotropy and uniaxial phase plate 5b having negative refractive index anisotropy as FIG. 1 shows, by including the additional uniaxial phase plate 6 having positive refractive index anisotropy, the dependency on viewing angles at the time of black displaying is reduced remarkably and asymmetry in the vertical direction is also improved, thereby realizing an LCD with wide viewing angles and excellent viewability.

Third Exemplary Embodiment

Figure 7:
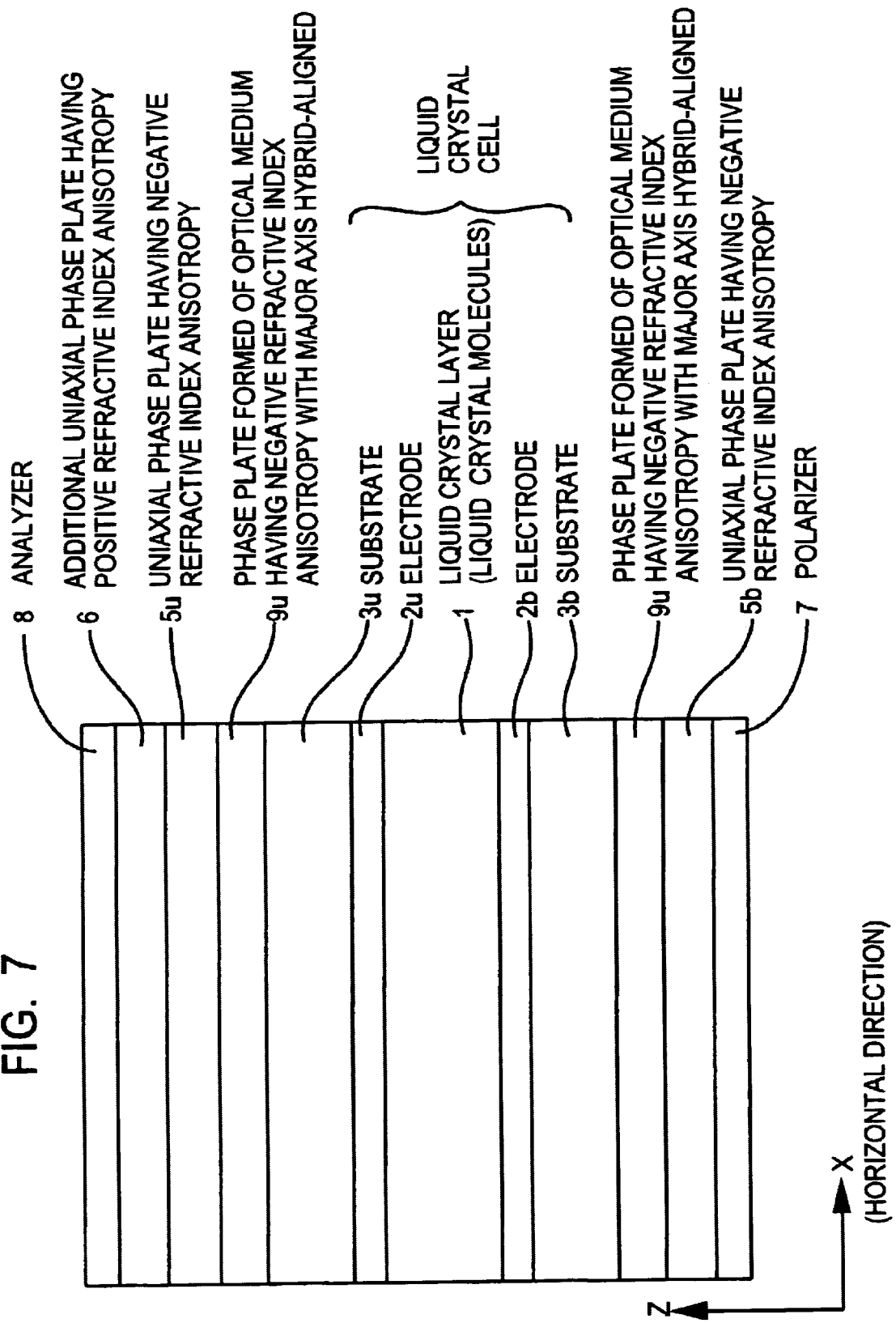
FIG. 7 is a diagrammatic sketch to show construction of a liquid crystal display device in a third exemplary embodiment of the present invention.

FIG. 7 is a partial cross-sectional view to show the structure of an LCD in a third exemplary embodiment of the present invention. In the same way as in the first exemplary embodiment, a liquid crystal layer 1 is sandwiched between substrates 3u and 3b formed of glass, quartz or the like. The liquid crystal molecules inside of the liquid crystal layer 1 are bend-aligned within the Z-X plane.

It is known that the use of a phase plate with an optical medium having negative refractive index anisotropy aligned in the same way as the liquid crystal molecules when the liquid crystal molecules having positive refractive index anisotropy are bend-aligned contributes to an effective improvement of retardation of the liquid crystal layer 1 in dependency of viewing angles.

Therefore, with the present exemplary embodiment, such a structure is adopted as the liquid crystal layer 1 is sandwiched between phase plates 9u and 9b formed of an optical medium having negative refractive index anisotropy with the optical axes thereof aligned within the Z-X plane in the same way as the liquid crystal molecules in the liquid crystal layer 1. The alignment of the optical axes of the optical medium in the phase plate 9u assumes the same hybrid alignment as the optical axes of liquid crystal molecules situated in the upper half of the liquid crystal layer as FIG. 11 shows, and the alignment of the optical axes of the optical medium in the phase plate 9b assumes the same hybrid alignment as the optical axes of liquid crystal molecules situated in the lower half of the liquid crystal layer.

In addition, uniaxial phase plates 5u and 5b having negative refractive index anisotropy, respectively, are disposed with the main axes thereof made nearly parallel to the Z axis, thereby preventing the brightness increase observed at the time of black displaying. Just as in the case of the first exemplary embodiment, the polarization axes 17 and 18 of the polarizer 7 and analyzer 8 are intersecting each other at right angles, respectively, and in order to utilize effectively the change in retardation of the liquid crystal layer 1 due to a voltage application an alignment is made in such a way that the angle between the polarization axis direction 17 of the polarizer 7 and the direction 11 of orthogonal projection of the optical axes of liquid crystal molecules onto the substrate makes about 45°.

Figure 9A:
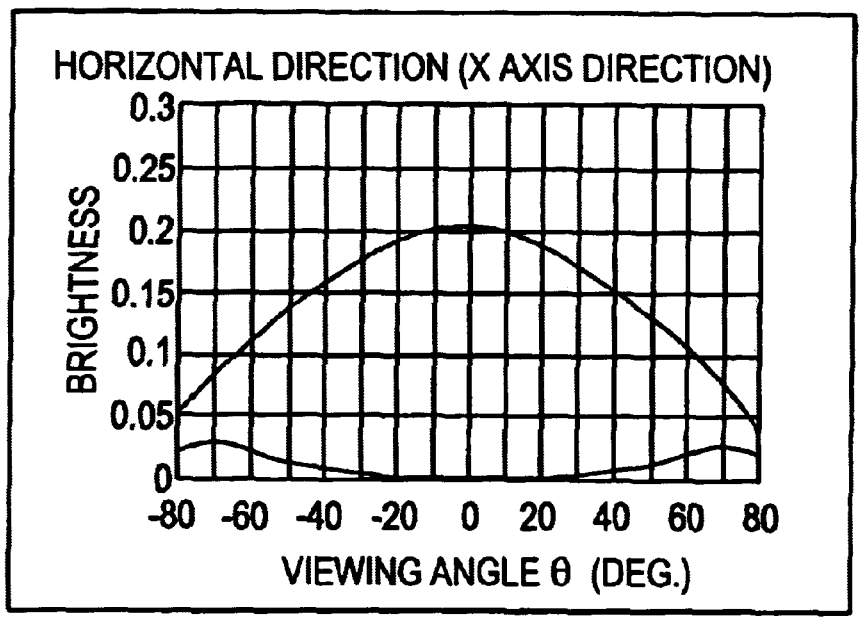
FIG. 9 shows diagrams to describe how white display brightness and black display brightness are dependent on viewing angles with a liquid crystal display device prepared according to the conventional technology.
Figure 9B:
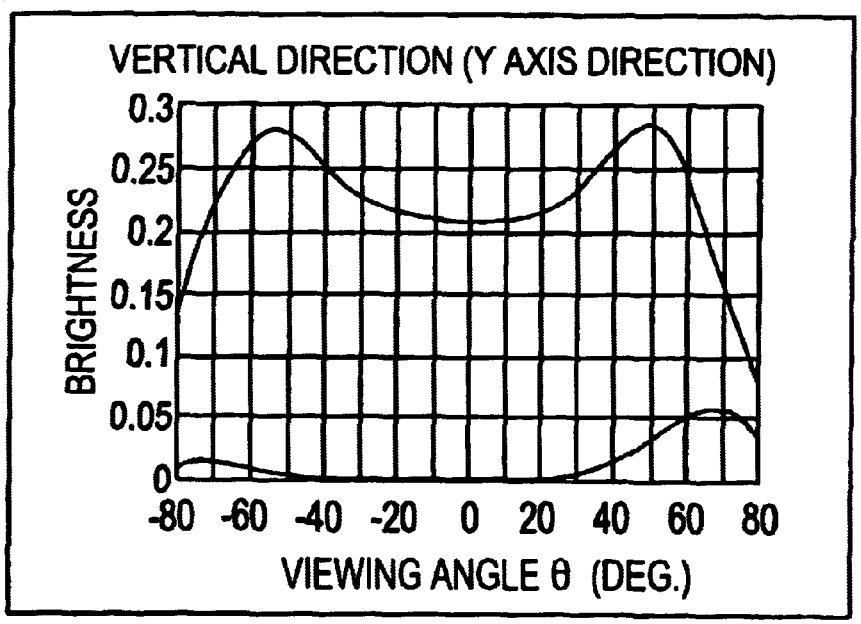

Up to this much has been considered to be included in the structure of the conventional LCD and suppose the case where a product ($\Delta n \times d$) of liquid crystal molecule's refractive index anisotropy $\Delta n$ and a thickness d of the liquid crystal layer 1 is 830 nm, the total of retardation of the uniaxial phase plates 9u and 9b with an optical medium having negative refractive index anisotropy made hybrid-aligned is 40 nm and the total of retardation of the uniaxial phase plates 5u and 5b having negative refractive index anisotropy is 600 nm. FIG. 9 shows viewing angle dependency of brightness at the time of white displaying and black displaying in the foregoing case.

Figure 8:
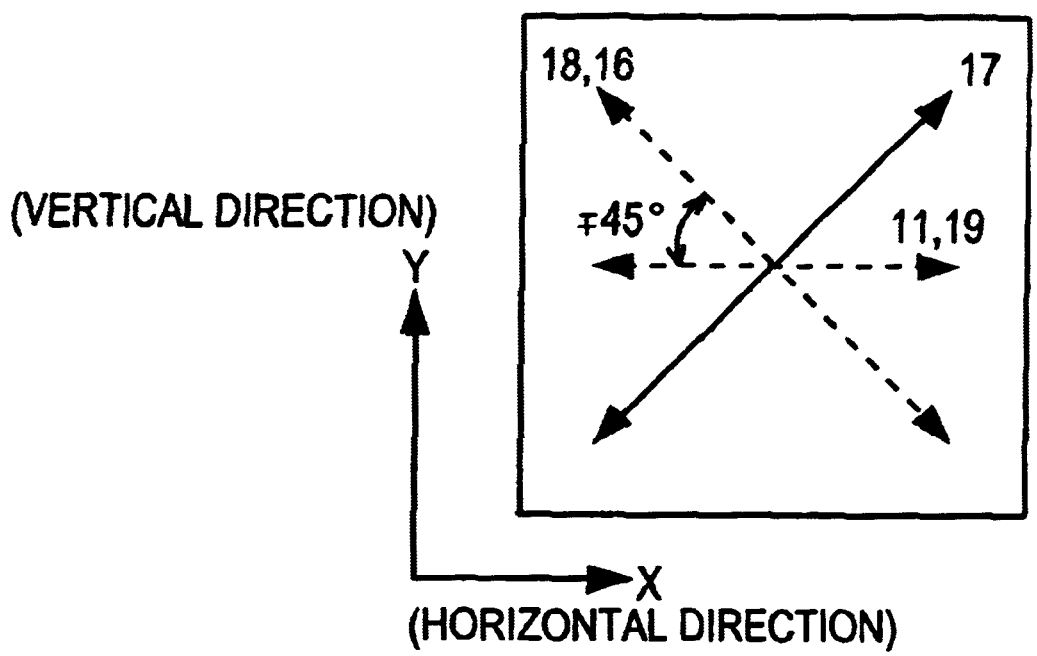
FIG. 8 is a plan view prepared for describing alignment directions of phase plates' optical axes in the third exemplary embodiment of the present invention.

In FIG. 9, the horizontal direction means the X axis direction in FIG. 7 and FIG. 8 just the same as in the case of the first exemplary embodiment and the vertical direction means the Y axis direction in FIG. 8. Further, a double-headed arrow 19 in FIG. 8 indicates the direction of the major axis of an optical medium having negative refractive index anisotropy and assuming a hybrid alignment, the direction being the direction of orthogonal projection onto the substrate. In addition, the viewing angle θ is a slanting angle making with the direction of the normal to the substrate, i.e., the Z axis direction of FIG. 7 and, when the slanting angle is made from the Z axis in the positive direction of the X axis and from the Z axis in the positive direction of the Y axis, the viewing angle θ is defined as being positive. Ordinates in FIG. 9 are normalized with the brightness of the light source taken as 1 on the scale.

Thus, with a conventional LCD having phase plates 9u and 9b formed of an optical medium having the major axis thereof assuming a hybrid alignment and having negative refractive index anisotropy, the brightness increase in black display state is enhanced when the slanting angle from the Z axis becomes large. Particularly, asymmetry in the vertical direction becomes prominent and the brightness increase in black display state is very much enhanced when the viewing angle θ is in the positive direction, thereby degrading the contrast remarkably.

Figure 10A:
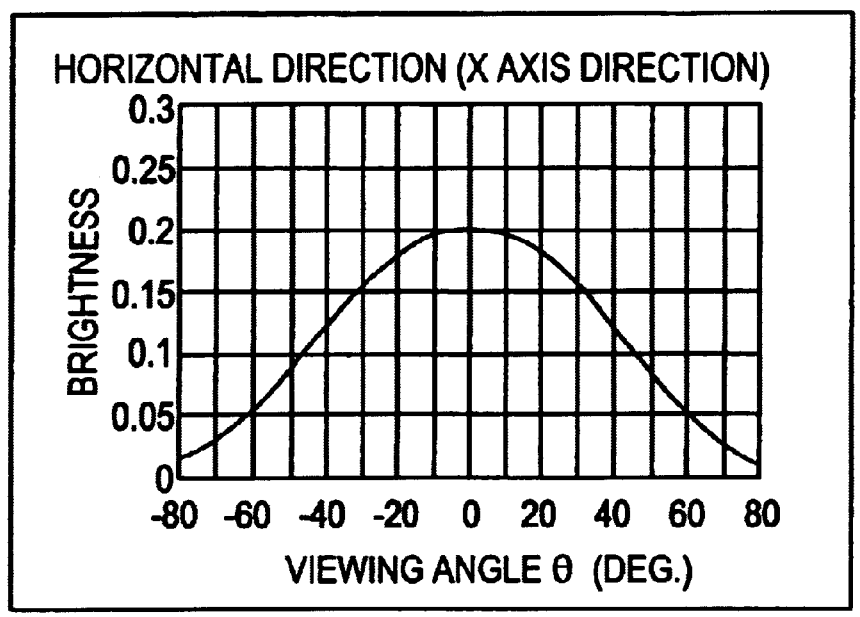
FIG. 10 shows diagrams to describe how white display brightness and black display brightness are dependent on viewing angles with the liquid crystal display device in the third exemplary embodiment of the present invention.
Figure 10B:
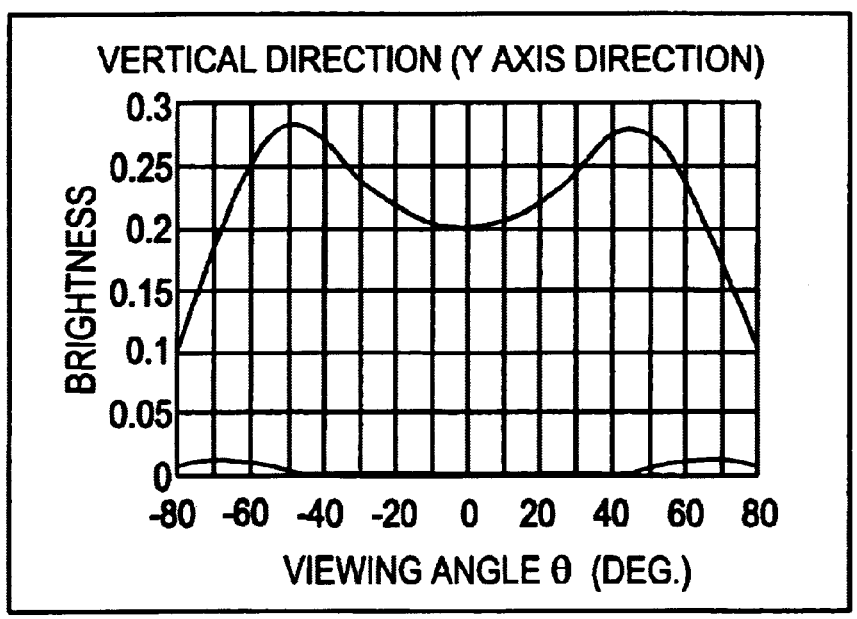

Therefore, with the present third exemplary embodiment, as FIG. 7 shows the structure of the LCD, an additional uniaxial phase plate 6 having positive refractive index anisotropy is arranged in such a way as the optical axis thereof does not intersect at right angles the direction of orthogonal projection of the liquid crystal molecule's axis onto a substrate, and favorably is made nearly parallel to the polarization axis of an analyzer, for example. FIG. 10 shows viewing angle dependency of brightness at the time of white displaying and also at the time of black displaying when a uniaxial phase plate 6 having retardation of 150 nm is in place. When compared with the conventional LCD as FIG. 9 shows, it is clearly seen that the adoption of the additional uniaxial phase plate 6 brings about a further reduction in viewing angle dependency in the horizontal direction at the time of black displaying and also an improvement of asymmetry in the vertical direction accompanied by an effect of preventing the brightness increase in black display state, particularly, in the positive direction of the viewing angle θ.

When a comparison is made in the viewing angle ranges exceeding 10 or more of contrast, the LCD of the present invention shows viewing angles of −80° to 80° in the horizontal direction and also −80° to 80° in the vertical direction while the conventional LCD showing viewing angles of −50° to 50° in the horizontal direction and −80° to 50° in the vertical direction, thereby proving that the structure of the LCD in the present exemplary embodiment is allowed to have high contrast over an extremely wide range of viewing angles.

Thus, by employing an additional uniaxial phase plate 6, a remarkable reduction in viewing angle dependency at the time of black displaying is made possible and also an improvement in asymmetry in the vertical direction is made possible, thereby enabling the realization of a wide viewing angle LCD with excellent viewability.

Although the present exemplary embodiment is based on such settings as a product ($\Delta n \times d$) of liquid crystal molecule's refractive index anisotropy $\Delta n$ and a thickness d of the liquid crystal layer 1 is 830 nm, the total of phase plates 9u and 9b formed of an optical medium with the major axis thereof assuming a hybrid alignment and having negative refractive index anisotropy is 40 nm in retardation, the total of the uniaxial phase plates 5u and 5b having negative refractive index anisotropy is 600 nm in retardation and the additional uniaxial phase plate 6 having positive refractive anisotropy is 150 nm in retardation, the effectiveness of the present invention is not restricted by the foregoing specific settings. For example, when a liquid crystal different from above in characteristics is used, it suffices that the summation of retardation of respective phase plates 9u and 9b formed of an optical medium with the major axis thereof assuming a hybrid alignment and having negative refractive index anisotropy is set up so as to be equal to the retardation of the liquid crystal layer 1 under the state of black displaying. Also, it suffices that the retardation of respective uniaxial phase plates 5u and 5b having negative refractive index anisotropy is set up so as to compensate for the variation in retardation of the liquid crystal layer when the light is incident in a slanting direction. Further, the retardation of the additional uniaxial phase plate 6 is allowed to be set up arbitrarily within the scope where an improvement in viewing angle characteristics is made possible. All in all, the effectiveness of the present invention is recognizable in any of the foregoing cases.

Although the optical axis of the additional uniaxial phase plate 6 is made nearly parallel to the polarization axis 18 of the analyzer 8, the direction of the foregoing optical axis is not restricted by the above particular direction and the high contrast range can be expanded even when the optical axis of the additional uniaxial phase plate 6 is made nearly parallel to the polarization axis 17 of the polarizer 7. However, the aligning the optical axis of the additional uniaxial phase plate 6 nearly in parallel with the polarization axis makes the effect of viewing angle expansion more enhanced, resulting in a favorable consequence.

Accordingly, the present invention makes it possible to gain high contrast over an extremely wide range of viewing angle by arranging an additional uniaxial phase plate having positive optical anisotropy in such a way as the optical axis thereof does not intersect at a right angles the direction of orthogonal projection of the liquid crystal molecule's axis onto a substrate and, in particular, is situated nearly in parallel with the polarization axis of an analyzer, and also to prevent the degrading of contrast under the state of black displaying in the viewing direction perpendicular to the optical axes of the liquid crystal molecules where viewing angle dependency is particularly large, thereby allowing excellent viewing angle characteristics to be achieved.

INDUSTRIAL USABILITY

The present invention deals with a problem of contrast degrading in the viewing direction perpendicular to the axes of the liquid crystal molecules, which has been an issue with an OCB mode LCD, and solves the problem by an introduction and proper arrangement of an additional uniaxial phase plate, thereby realizing enhanced contrast over an extremely wide viewing angle range even under the state of black displaying, where viewing angle dependency is large.

Consequently, it has become possible now to provide the most suitable LCD to an application area where a display device with a large screen size and high resolution is required to replace the conventional CRT display device. In addition, this technology can be widely utilized not only in the foregoing area but also in other areas where an LCD of excellent viewing angle characteristics is required.

What is claimed is:

1. A liquid crystal display device utilizing an OCB mode, comprising:
   a polarizer and an analyzer with respective polarization axes intersecting each other at right angles;
   two substrates located between said polarizer and analyzer;
   a liquid crystal layer sandwiched between said substrates, wherein liquid crystal molecules are bend-aligned;
   a first uniaxial phase plate having negative optical anisotropy and having an optical axis direction perpendicular to said substrate, said first uniaxial phase plate located between said polarizer or analyzer and the nearer of said two substratates;
   a second uniaxial phase plate having positive optical anisotropy with an optical axis direction perpendicular to the direction of orthogonal projection of the optical axes of said liquid crystal molecules onto said substrate, said second uniaxial phase plate located between said polarizer or analyzer and the nearer of said two substrates; and
   an additional uniaxial phase plate having positive optical anisotropy with an optical axis direction not perpendicular to the direction of orthogonal projection of the optical axes of said liquid crystal molecules onto said substrate, said additional uniaxial phase plate located between said polarizer or analyzer and the nearer of said two substrates.

2. The liquid crystal display device according to claim 1, wherein the optical axis direction of said additional uniaxial phase plate is substantially parallel with the direction of the polarization axis of said analyzer.

3. The liquid crystal display device according to claim 1, wherein:
   said first uniaxial phase plate has negative optical anisotropy,
   said second uniaxial phase plate has positive optical anisotropy,
   said liquid crystal layer is sandwiched between said two substrates, and
   said first uniaxial phase plate, said second uniaxial phase plate, said additional uniaxial phase plate, and said analyzer are located sequentially as a stack on said polarizer.

4. A liquid crystal display device utilizing an OCB mode, comprising:
   a polarizer and an analyzer with respective polarization axes intersecting each other at right angles;
   two substrates located between said polarizer and analyzer;
   a liquid crystal layer sandwiched between said substrates, wherein liquid crystal molecules are bend-aligned;
   a biaxial phase plate located between said polarizer or analyzer and the nearer of said two substrates; and
   an additional uniaxial phase plate having positive optical anisotropy with the optical axis direction thereof and not perpendicular to the direction of orthogonal projection of the optical axes of said liquid crystal molecules onto said substrate, said additional uniaxial phase plate located between said polarizer or analyzer and the nearer of said two substrates.

5. The liquid crystal display device according to claim 4, wherein the optical axis direction of said additional uniaxial phase plate is substantially parallel with the direction of the polarization axis of said analyzer.

6. The liquid crystal display device according to claim 4, wherein:
   said biaxial phase plate, said liquid crystal layer sandwiched between said substrates, said biaxial phase plate, said additional uniaxial phase plate, and said analyzer are located sequentially as a stack on said polarizer.

7. A liquid crystal display device utilizing and OCB mode, comprising:
   a polarizer and an analyzer with respective polarization axes intersecting each other at right angles;
   two substrates located between said polarizer and analyzer;
   a liquid crystal layer sandwiched between said substrates, wherein liquid crystal molecules are bend-aligned;
   a phase plate formed of an optical medium having negative refractive index anisotropy with the optical axis thereof being hybrid-aligned, said phase plate located between said polarizer or analyzer and the nearer of aid two substrates;
   a uniaxial phase plate having negative optical anisotropy and having the optical axis direction thereof perpendicular to said substrate, said uniaxial phase plate located between said polarizer or analyzer and the nearer of said two substrates; and
   an additional uniaxial phase plate having positive optical anisotropy with the optical axis direction thereof not perpendicular to the direction of orthogonal projection of the optical axes of said liquid crystal molecules onto said substrate, said additional uniaxial phase plate located between said polarizer or analyzer and the nearer of said two substrates.

8. The liquid crystal display device according to claim 7, wherein the optical axis direction of said additional uniaxial phase plate is substantially parallel with the direction of the polarization axis of said analyzer.

9. The liquid crystal display device according to claim 7, wherein:
   said first uniaxial phase plate has negative optical anisotropy;
   said phase plate comprises an optical medium having negative refractive index anisotropy with the optical axis thereof being hybrid-aligned;
   said liquid crystal layer is sandwiched between said two substrates; and
   said phase plate, said first uniaxial phase plate, said additional uniaxial phase plate, and said analyzer are located sequentially as a stack on said polarizer.

* * * * *

UNITED STATES PATENT AND TRADEMARK OFFICE
CERTIFICATE OF CORRECTION

PATENT NO. : 6,693,693 B1  
DATED : February 17, 2004  
INVENTOR(S) : Mitsutaka Okita et al.

It is certified that error appears in the above-identified patent and that said Letters Patent is hereby corrected as shown below:

Column 12,  
Line 33, change "aid" to -- said --.

Signed and Sealed this

Fifteenth Day of June, 2004

JON W. DUDAS  
*Acting Director of the United States Patent and Trademark Office*